(12) United States Patent
Abe

(10) Patent No.: US 6,883,001 B2
(45) Date of Patent: Apr. 19, 2005

(54) DOCUMENT INFORMATION SEARCH APPARATUS AND METHOD AND RECORDING MEDIUM STORING DOCUMENT INFORMATION SEARCH PROGRAM THEREIN

(75) Inventor: Seiichiro Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 09/761,222

(22) Filed: Jan. 16, 2001

(65) Prior Publication Data

US 2001/0047351 A1 Nov. 29, 2001

(30) Foreign Application Priority Data

May 26, 2000 (JP) ........................................ 2000-155867

(51) Int. Cl.$^7$ .............................................. G06F 17/30
(52) U.S. Cl. ................................. 707/10; 707/3; 707/6; 704/9; 709/216; 709/218
(58) Field of Search ............................... 707/3, 10, 100, 707/104.1, 4, 6; 704/9, 7, 239, 246, 251; 709/216, 218

(56) References Cited

U.S. PATENT DOCUMENTS

| | | | | |
|---|---|---|---|---|
| 5,983,221 A | * | 11/1999 | Christy ........................... 707/5 |
| 6,078,917 A | * | 6/2000 | Paulsen et al. ................. 707/6 |
| 6,119,114 A | * | 9/2000 | Smadja ........................... 707/7 |
| 6,182,085 B1 | * | 1/2001 | Eichstaedt et al. ........ 707/104.1 |
| 6,449,617 B1 | * | 9/2002 | Quinn et al. ................. 707/100 |
| 6,549,898 B1 | * | 4/2003 | Inaba et al. ..................... 707/5 |
| 6,711,585 B1 | * | 3/2004 | Copperman et al. ..... 707/104.1 |

OTHER PUBLICATIONS

"WebMate: A Personal Agent for browsing and Searching," Chen et al., Proceedings of the 2nd International Conference on Autonomous Agents, May, 1998, NY, USA, ACM Press, pp. 132–139.*

"CiteSeer: An Autonomous Web Agent for Automatic Retrieval and identification of Interesting Publications," by Bollacker et al. proceedings of the International Conference on Autonomous Agents, May, 1998, ACM Press, pp. 116–123.*

* cited by examiner

Primary Examiner—Shahid Al Alam
(74) Attorney, Agent, or Firm—Greer, Burns & Crain, Ltd.

(57) ABSTRACT

An apparatus for searching document information in response to a search request from a client is disclosed. When a document file is designated as a search condition by a search condition designating unit of the client, the unit causes contents of the designated file to be transmitted via a network. A document search unit of a search machine forms a keyword based on the file contents transmitted from the search condition designating unit, and searches similar documents from an index or selection of important words extracted from search target documents provided in a search database.

10 Claims, 14 Drawing Sheets

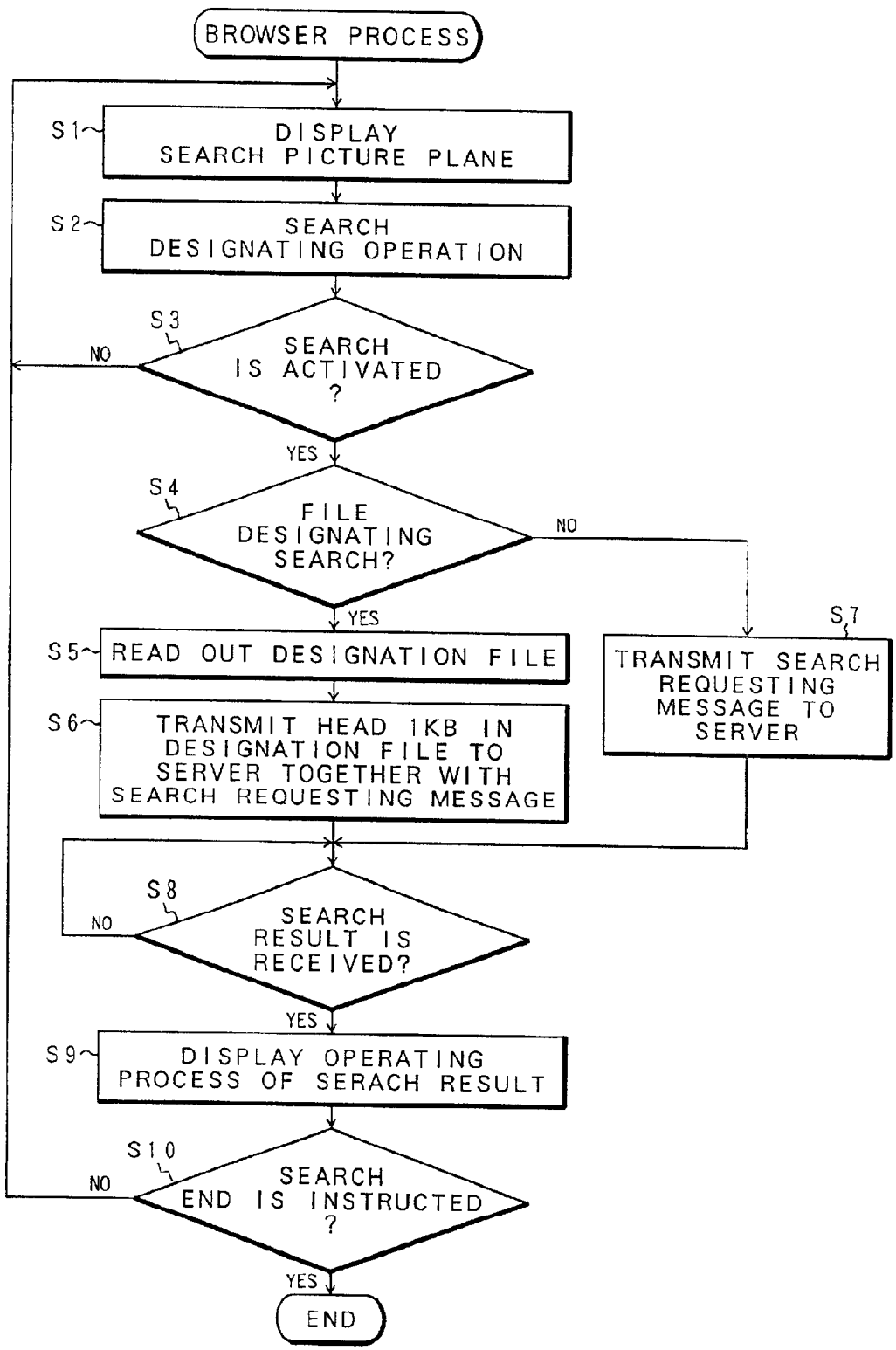
F I G. 5

FIG. 6A

FUJITSU ESTABLISHES A SHOPPING SITE "WEB MART"

FILE (F)  EDIT (E)  VIEW (V)  JUMP (G)  COMMUNICATOR (C)  HELP (H)

[PRESS RELEASE]

FUJITSU
2000-0081
APRIL 20, 2000
FUJITSU, LTD.

FUJITSU ESTABLISHES A SHOPPING SITE "WEB MART" FOR SELLING PERSONAL COMPUTERS TO INDIVIDUAL CUSTOMERS BY USING THE INTERNET. ~ CONVENIENT SERVICES SUCH AS PRODUCT SEARCH, ETC. BASED ON A BUDGET OF THE CUSTOMER AND DESIRED SPECIFICATION ARE PROVIDED ~

WE WILL ESTABLISH A SITE "WEB MART" (URL:http://www.fujitsu-webmart.com/) TO PROVIDE SALES AND SERVICES OF PERSONAL COMPUTERS TO INDIVIDUAL CUSTOMERS AS TARGETS ON THE INTERNET HOMEPAGE AND START ITS OPERATION FROM APRIL 21.

RECENTLY, IN ACCORDANCE WITH THE BACKGROUND OF THE RAPID SPREAD OF THE INTERNET TO HOMES, IT IS PRESUMED THAT AN ONLINE SHOPPING BY WHICH GOODS CAN BE EASILY ORDERED WILL BE WIDELY USED. IN ASSOCIATION WITH A VARIETY OF LIFE STYLES OF THE CUSTOMERS, IT IS FURTHER DESIRED THAT GOODS AND SERVICES ACCORDING TO THE NEEDS OF EACH CUSTOMER ARE PROVIDED.

HTML FILE

```
<HTML>
<HEAD>
<TITLE>SEARCH DATABASE</TITLE>
</HEAD>
<BODYBGCOLOR="#FFFFFF">
<H4>SEARCH DATABASE</H4>
<HR>

<P>IT IS A DATABASE WHICH IS USED FOR SEARCH.<BR>
THE TITLE AND STORING LOCATION OF THE DOCUMENT AS A SEARCH
TARGET ARE RECORDED. THE SEARCH DATABASE IS PERIODICALLY
UPDATED AND THE LATEST INFORMATION IS RECORDED.
INTELLIGENTSEARCH REALIZES A HIGH-SPEED SEARCH BY THE
SEARCH DATABASE.<BR>

</BODY>
</HTML>
```

FIG. 9B

EXTRACTION TEXT DOCUMENT

SEARCH DATABASE, SEARCH DATABASE. IT IS A DATABASE WHICH IS USED FOR SEARCH. THE TITLE AND STORING LOCATION OF THE DOCUMENT AS A SEARCH TARGET ARE RECORDED. THE SEARCH DATABASE IS PERIODICALLY UPDATED AND THE LATEST INFORMATION IS RECORDED. INTELLIGENTSEARCH REALIZES A HIGH-SPEED SEARCH BY THE SEARCH DATABASE.

FIG. 10

| PROPERTY | | |
|---|---|---|
| WHOLE | | |

WITH RESPECT TO DOCUMENT MANAGEMENT SYSTEM

PROTOCOL   HYPER TEXT TRANSFER PROTOCOL (HTTP)

KIND   FILE

ADDRESS   http://www.fujitsu.co.jp/productnst/view/document001
(URL)   buncyokanri

SIZE   300 BYTES

DATE OF FORMATION   MAY 16, 2000

DATE OF CHANGE   MAY 16, 2000

[CERTIFY]  [ANALYZE]

[OK]  [CANCEL]

| Microsoft Excel-Address.xls | | | | | | |
|---|---|---|---|---|---|---|
| FILE (F) | EDIT (E) | DISPLAY (V) | INSERT (I) | FORMAT (O) | TOOLS (T) | DATA (D) |

| | A | B | C | D | E | F |
|---|---|---|---|---|---|---|
| 1 | NAME | JOINT NAME | COMPANY | DEPARTMENT | POSITION | POSTAL CODE |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | | | | | | |

Sheet1　Sheet2　Sheet3

COMMAND

FIG. 11B

| WINDOW (W) | HELP (H) | | | | | | |
|---|---|---|---|---|---|---|---|
| G | H | I | J | K | L | M |
| ADDRESS 1 | ADDRESS 2 | ADDRESS 3 | PHONE NO. | FAX NO. | EMAIL ADDRESS | REMARKS |
| | | | | | | |

FIG.12

EXTRACTION TEXT DOCUMENT

"SHEET", "NAME", "JOINT NAME", "COMPANY", "DEPARTMENT",
"POSITION", "POSTAL CODE", "ADDRESS_1", "ADDRESS_2",
"ADDRESS_3", "PHONE NO.", "FAX NO.", "EMAIL_ADDRESS",
"SHEET 1", "SHEET 2", "SHEET 3"

DOCUMENT INFORMATION SEARCH APPARATUS AND METHOD AND RECORDING MEDIUM STORING DOCUMENT INFORMATION SEARCH PROGRAM THEREIN

BACKGROUND OF THE INVENTION

1. Field of the Invention

The invention relates to document information search apparatus and method for promptly searching necessary documents from a large amount of document data and to a recording medium in which a document information search program has been stored. More particularly, the invention relates to document information search apparatus and method for searching documents having similar contents by a simple operation such that a document file itself is designated as a search condition and to a recording medium in which a document information search program has been stored.

2. Description of the Related Arts

Hitherto, in a document management system using a network environment, a document information search apparatus which can search necessary documents from a large amount of document data existing on the Internet or Ethernet and can rapidly refer to it has been provided. In a document search in such a case, the user designates one or a plurality of proper words or character trains which are considered to be included in the necessary documents as keywords and searches the documents including the word(s) of the designated keyword from a search database, and a document list is displayed as a search result. In such a document information search apparatus, with respect to search target documents existing on the network, an index describing a list of important words extracted from their contents is formed for every document and stored in the search database. If a search request in which a keyword is designated is issued from the user, the index in the search database is searched, thereby outputting a search result of the document list. Further, according to the conventional document information search apparatus, after the user searched the documents which are considered to be necessary from the document list searched by the designation of the keyword, if a search of similar documents is designated with respect to the selected documents, words in which a frequency of appearance in the search documents is high are automatically extracted and added to previously executed search conditions on the basis of a condition of the OR, so that the similar documents can be searched.

However, in the case where the user wants to obtain an interesting document and search documents with contents similar to such a document via Email or the Internet, in the present situation, a word or character train included in the obtained document is selected and designated as a keyword each time and documents including the word of the designated keyword are searched from the database, thereby obtaining a document list. Subsequently, the user has to select a document from the searched document list, designate a similar document search, and search similar documents from the database. That is, even if the user desires to search similar documents of the document obtained by the Email or Internet, according to the conventional document information search apparatus, with respect to only the document which has already been registered in the search database, the similar documents can be searched by using such a registered document as a search condition, and the similar documents cannot be directly searched by using the document obtained by the user by the Email or Internet as a search condition.

When the user selects keywords which are considered to be necessary for document search from the document obtained by the Email or Internet and inputs such keywords as a search condition, if there are many keywords, it is troublesome to input them. Unless the keywords are sufficiently designated, there is a case where a search leakage occurs and an expected search result is not obtained. Further, there is also a case where the number of search documents which are obtained as a document list becomes extremely large. There is a case where it is very laborious to search necessary documents by opening documents which are considered to be concerned with target documents from the document list.

SUMMARY OF THE INVENTION

According to the invention, document information search apparatus and method in which documents similar to a document which is not registered in a search database can be promptly searched by a simple operation are provided and a computer-readable recording medium in which a document information search program has been stored is provided.

According to the invention, there is provided a document information search apparatus which searches document information and responds on a search side such as a server or the like on the basis of a search request sent from a client or the like via a network, wherein: a search condition designating unit which, when a file is designated as a search condition, transmits contents of the designated file through the network is provided for a requesting source such as a client or the like; and a search machine which forms a keyword from the file contents transmitted from the search condition designating unit and searches similar documents is provided on a search side such as a server or the like. Therefore, if the user wants to obtain documents including interesting contents by Email, Internet, or the like and search documents of contents similar to such a document or the like, a file which was uploaded by a designation of a document is designated as a search condition, thereby enabling the documents having similar contents to be searched. Therefore, any document which is not registered in a database can be freely designated as a search condition, a troublesome input of keywords based on the document contents becomes unnecessary, and the similar documents can be easily and promptly searched.

The search condition designating unit on the search requesting source transmits a head file portion of the designated file contents. Since many important keywords necessary for document search exist usually in a head portion of a document, only the head portion of the file contents, for example, the head portion of 1 kB is transmitted as a search condition. Since the document files which are used for the search condition have various sizes, by deciding a capacity of the file which is transmitted as a search condition, a communication load and the processes on the search side are reduced. The search condition designating unit includes an HTML file and an Excel file as files which are designated as a search condition. Even in the other file formats, the files include a file of an arbitrary file format so long as it is a file from which a text document can be extracted. A database in which index information describing a list of important words extracted from the search target documents has been stored for every document is provided for the search machine on the server side. The document search unit of the search machine comprises: a text extraction processing unit which extracts a text document from the file contents received in response to the search request; a morpheme analyzing unit which extracts nouns by a morpheme analysis of the text document; a keyword forming unit which extracts important words from the nouns and forms a keyword in which the important words are coupled by OR; and a search executing unit which searches similar documents by searching the search database by the keyword and notifies the client of a search result. The keyword forming unit counts the number (H) of times of appearance showing in which document, in the index of each search document stored in the search database, each noun appears and selects a predetermined number of upper words each having the number (H) of times of appearance in a predetermined range, thereby forming the keyword. When the number of documents in the index is assumed to be N, the keyword forming unit selects the upper ten words each having the number of times of appearance in a range in which the number (H) of times of appearance is equal to, for example, $$2N/3 \geq H \geq 1$$

and forms the keyword. Thus, the important words which have been registered in the index of the database and are necessary for the similar document search of the existing documents are narrowed down, thereby raising precision of the similar document search. Further, the keyword forming unit allows property information extracted from the received file to be included in the keyword and searched in response to the search request. As property information in this case, there are a writer of the file received in response to the search request, a document title, and the like. By adding the property information of the file into the search conditions as mentioned above, for example, in the case where the user wants to specify the writer or the like, the similar documents can be properly narrowed down. The search condition designating unit of the search requesting source is provided by a WWW browser of the client and the contents of the file designated on a search request picture plane of the WWW browser are transmitted to a WWW server through the network and sent to the search machine.

The invention also provides the search machine serving as a document information search apparatus on the search side such as a server or the like. The document information search apparatus serving as a search machine comprises: a search database in which index information describing a list of important words extracted from search target documents has been stored every document; a text extraction processing unit which extracts a text document from the contents of the file received by a search request which is transmitted from a network in which a document file has been designated as a search condition; a morpheme analyzing unit which extracts nouns by a morpheme analysis of the text document; a keyword forming unit which extracts important words from the nouns and forms a keyword in which the important words are coupled by OR; and a search executing unit which searches similar documents by searching the search database by the keyword and notifies a requesting source of a search result.

The invention provides a document information search method of searching document information and responding on a search machine side such as a server or the like on the basis of a search request which is transmitted from a search requesting source such as a client or the like via a network, comprising the steps of: storing index information describing a list of important words extracted from search target documents into a search database of the server every document; when a document file is designated as a search condition, transmitting contents of a designated file to a search side via the network together with the search request; and on the search side, extracting a text document from the received file contents in response to the search request, extracting nouns by a morpheme analysis of the text document, extracting important words from the nouns, forming a keyword in which the important words are coupled by OR, searching similar documents by searching a search database by the keyword, and notifying the client of a search result. The details of the document information search method are fundamentally the same as those of the apparatus construction.

Further, the invention provides a computer readable recording medium in which a document information search program has been stored, wherein the document information search program comprises the steps of: receiving a search request in which a document file is designated as a search condition; extracting a text document from contents of the file received in response to the search request; extracting nouns by a morpheme analysis of the text document; extracting important words from nouns and forming a keyword in which the important words are coupled by OR; and searching similar documents by searching a database by the keyword and notifying a requesting source of a search result.

The above and other objects, features, and advantages of the present invention will become more apparent from the following detailed description with reference to the drawings.

BRIEF DESCRIPTION OF THE DRAWINGS

FIG. 5 is a flowchart for a browser process in FIG. 2;

FIGS. 6A and 6B are explanatory diagrams for the search requesting operation in which a document file is designated as a search condition according to the invention;

FIGS. 9A and 9B are explanatory diagrams for extracting a text document from an HTML file by the process in FIG. 7;

FIG. 10 is an explanatory diagram of property information provided in the HTML file which is used for search according to the invention;

FIGS. 11A and 11B are explanatory diagrams of an Excel document which is used as a text extraction target by the process in FIG. 7; and FIG. 12 is an explanatory diagram of a text document extracted from the Excel document in FIGS. 11A and 11B.

DETAILED DESCRIPTION OF THE PREFERRED EMBODIMENT

Figure 1:
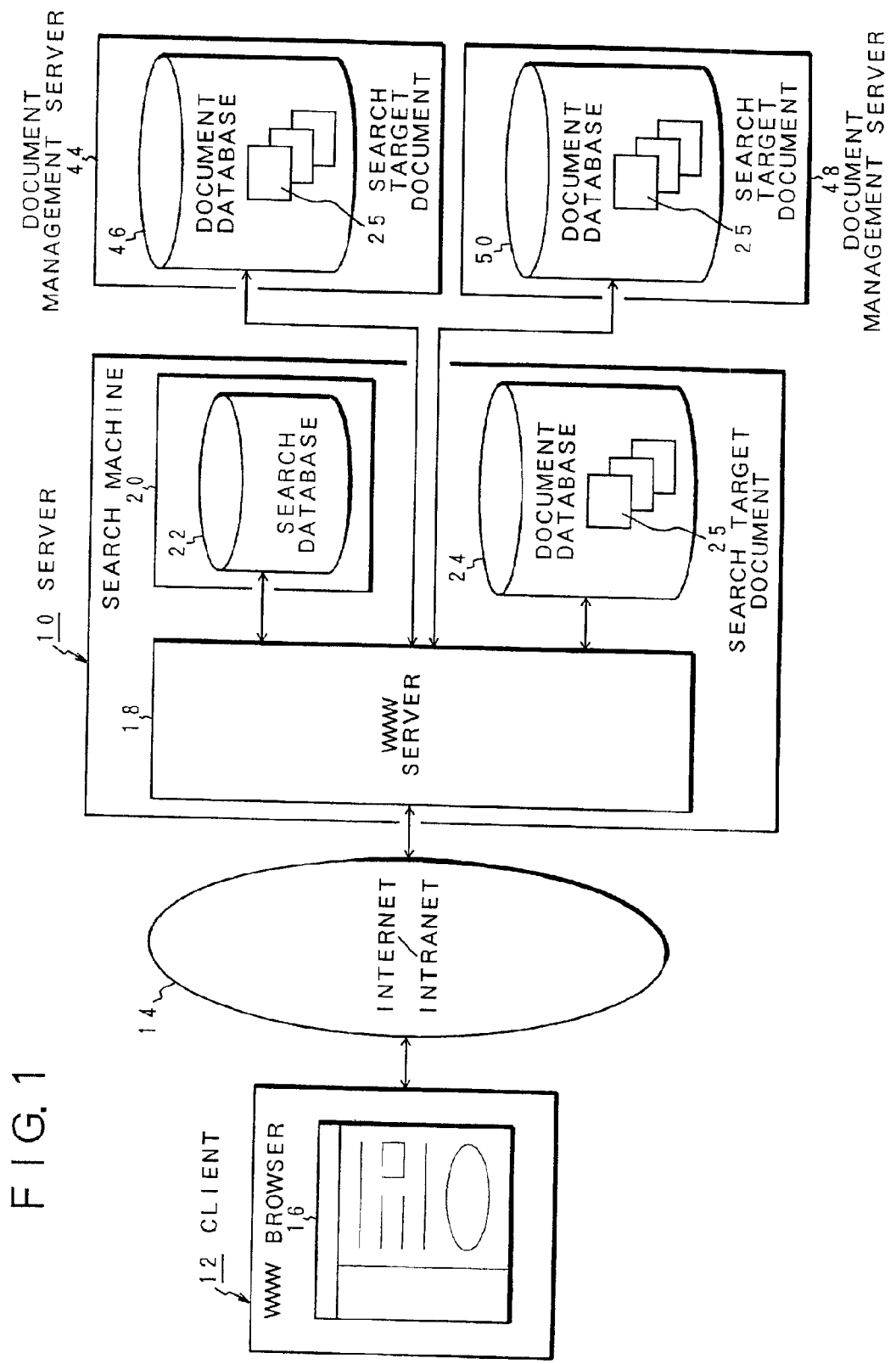
FIG. 1 is an explanatory diagram of a system construction of the invention.

FIG. 1 shows a system construction of a document information search apparatus according to the invention and relates to an example in the case where the system is constructed as a search system of a server client type using the Internet or Ethernet. A client 12 on the user side is connected to a server 10 via an Internet/Intranet 14. A WWW browser 16 for search is provided for the client 12. A search request of document information is issued to the server 10 by using the WWW browser 16 and a search result on the server 10 side is displayed. A WWW server 18, a search machine 20, and a document database 24 are provided for the server 10. A search database 22 has been stored in the search machine 20. Search target documents 25 have been stored in the document database 24. Further, external document management servers 44 and 48 are connected to the WWW server 18. Document databases 46 and 50 are also provided for the document management servers 44 and 48. The search target documents 25 have been stored in the document databases 46 and 50, respectively. The WWW server 18 provided for the server 10 receives the search request from the browser 16 and requests the search machine 20 to search. The search result returned from the search machine 20 is sent to the browser 16 and the browser 16 is allowed to display it. To process a whole sentence search to be processed at a high speed, the search database 22 functions as a storage for managing an index formed by a set of important words described in a document serving as a search target. A document name of the document and its storing location are recorded in the index. When the search request is received from the browser 16, the search machine 20 executes a searching process with respect to the index in the search database 22 as a target. The search target documents 25 collected from the document management servers 44 and 48 have been stored in the document database 24. The index in the search database 22 is formed with respect to the document database search target documents 25 as targets. In such a search system of the server client type, a search condition designated by the user is sent to the WWW server 18 on the server 10 side via the Internet/Intranet 14 by using the browser 16 of the client 12. The designated search condition included in the search request received by the WWW server 18 is sent from the WWW server 18 to the search machine 20. The search machine 20 searches the documents which conform with the search condition from the search database 22 and notifies the WWW server 18 of a search result. The WWW server 18 sends the search result from the search machine 20 to the browser 16 of the client 12 and allows the browser 16 to display it. The user looks at the search result processed by the browser 16 and selects a link described in the search result, so that he can upload his desired search target documents 25 from the selected documents via the WWW server 18 and see the contents of the desired document 25.

Figure 2:
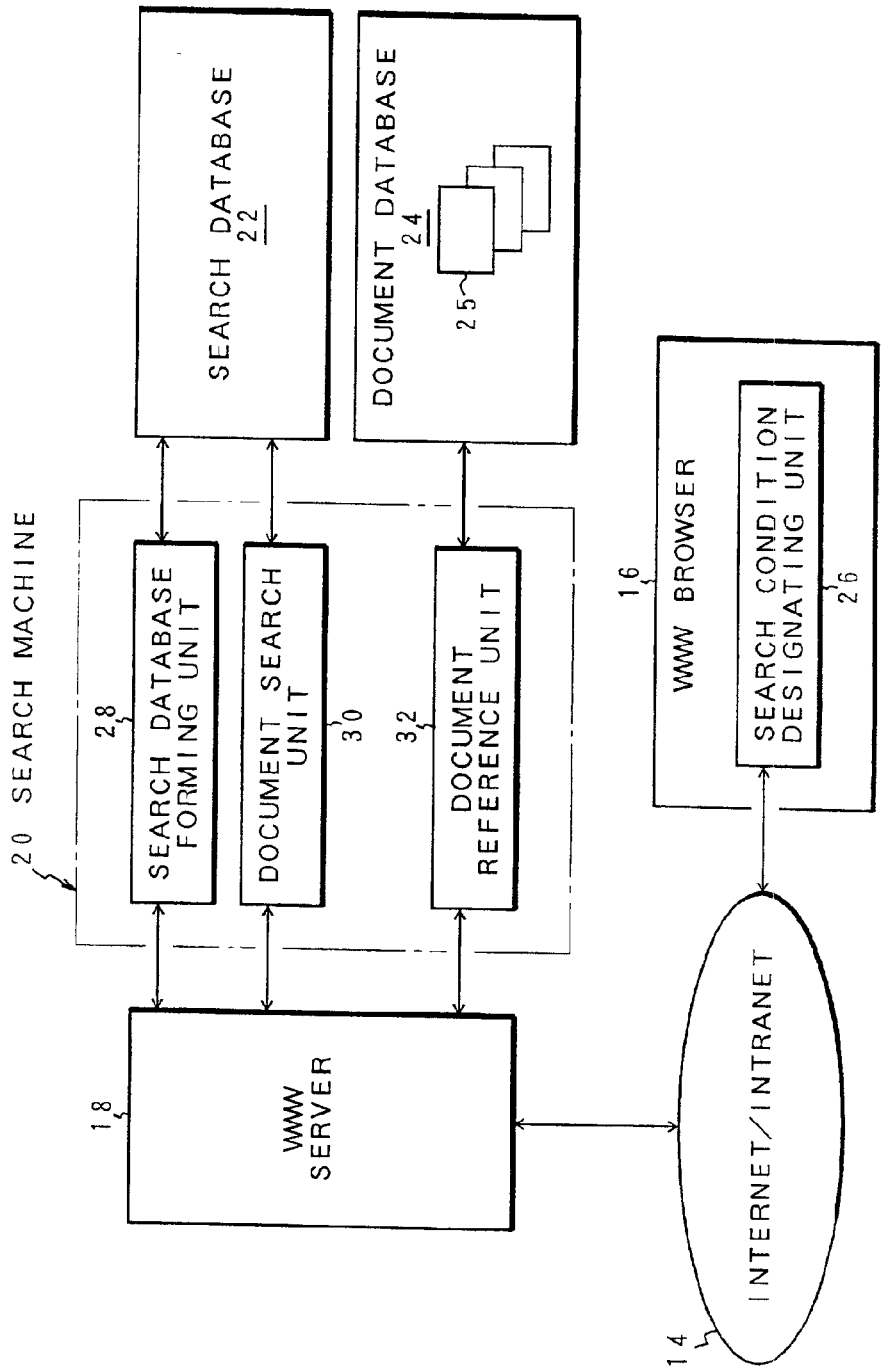
FIG. 2 is a block diagram of a functional construction of the invention.

FIG. 2 is a block diagram of a functional construction in the search system of FIG. 1. First, a search condition designating unit 26 is provided for the WWW browser 16 serving as a user side. The search condition designating unit 26 of the invention directly designates a document file, as a search condition, obtained by the user as a search condition via the Internet, Email, or the like, and transmits the contents of the designated file to a document search unit 30 of the search machine 20 via the WWW server 18 through the Internet/Intranet 14. Besides the search condition of the file designation which is newly provided in the invention, the search condition designating unit 26 can also designate the following search conditions.

I. Keyword search

II. Detail search in which a keyword is designated for each of a title of the document, a writer, and a text, and a search is performed.

III. Sentence search in which by inputting a daily word or sentence, the documents concerned with the text contents are searched.

IV. Similar document search in which the existing document registered in the search database 22 is used as a search condition.

And the like.

A search database forming unit 28, the document search unit 30, and a document reference unit 32 are provided for the search machine 20 provided on the WWW server 18 side. The search database forming unit 28 forms an index in the search database 22 and registers it. That is, with respect to each of the search target documents 25 collected and stored in the document database 24, the search database forming unit 28 extracts important words described in the search target documents 25, forms an index constructed by a set of extracted words, and stores it. Naturally, the document name, storing location, and the like of the search target documents have also been recorded in the index. The document search unit 30 forms a keyword from the file contents at the time when the file is designated as a search condition transmitted from the search condition designating unit 26 in the WWW browser 16, performs a search collation with the set of important words included in the index in the search database 22, searches documents similar to the document of the file designated as a search condition by the WWW browser 16, returns a search result from the WWW server 18 to the WWW browser 16, and allows the WWW browser 16 to display it. When the document to be referred to is selected from a document list as a search result sent by the WWW browser 16 and notified to the document reference unit 32 through the WWW server 18, the document reference unit 32 extracts a requested reference document from the document database 24 and returns it to the WWW browser 16.

Figure 3:
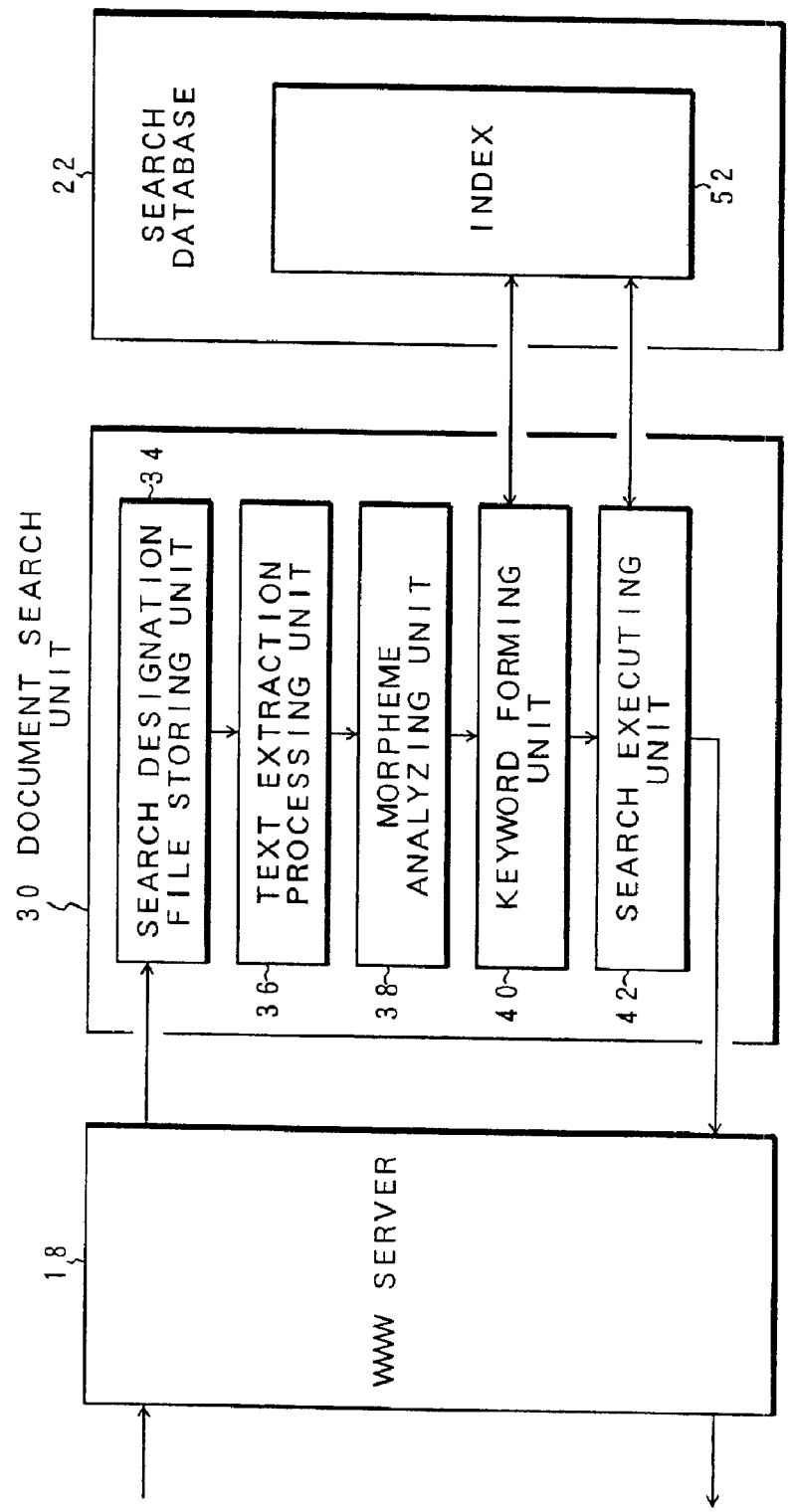
FIG. 3 is a block diagram of a document search unit according to the invention.

FIG. 3 shows the details of a functional construction of the document search unit 30 of the invention provided for the search machine 20 in FIG. 2. A search designation file storing unit 34, a text extraction processing unit 36, a morpheme analyzing unit 38, a keyword forming unit 40, and a search executing unit 42 are provided for the document search unit 30. An index 52 comprising a set of important words, the document name, storing location, and the like of each of the search target documents 25 in the document database 24 formed by the search database forming unit 28 in FIG. 2 has been stored in the search database 22. The file contents transmitted by the file designation of the search condition designating unit 26 in the WWW browser 16 in FIG. 2 are stored in the search designation file storing unit 34 in the document search unit 30. When the file contents are transferred from the WWW browser 16 side, a head file portion of the document file designated as a search condition, for example, 1 kB of the head portion is extracted and transmitted together with the search request to the WWW server 18 side. A capacity of the file which is transmitted as a search condition is set to a fixed capacity, for example, 1 kB as mentioned above, thereby setting a transfer load of the document contents to the search machine 20 side to be constant irrespective of a size of document file designated as a search condition. The searching process by the document search unit 30 in the search machine 20 is stabilized and a high processing speed is realized. The text extraction processing unit 36 extracts a text document from the file contents designated as a search condition stored in the search designation file storing unit 34. As a format of the document file which is designated as a search condition in the WWW browser 16, there are various file formats such as text file of Email, HTML file in the Internet, further, Excel file of an aggregate list, and the like. Therefore, to enable a search function to be presented with respect to a difference of the file formats, only the text document is extracted from the document files of various formats by the text extraction processing unit 36 and used as a search condition. The morpheme analyzing unit 38 subsequently provided extracts nouns included in the extracted text document by using a morpheme analysis. The nouns in the document contents extracted by the morpheme analyzing unit 38 are sent to the keyword forming unit 40. The keyword forming unit 40 extracts important nouns in order to form a keyword. As for the extraction of the important words in the keyword forming unit 40, first, the number (H) of times of appearance showing in which documents in the number (N) of documents registered in the index 52 in the search database 22 each noun appears is counted. When the number (H) of times of appearance of document in the index 52 is obtained, words in which the number (H) of times of appearance lies within a predetermined range, for example, $$(2N/3) \geq H \geq 1$$

are selected. Upper ten words in which the number (H) of times of appearance is large among the words selected as mentioned above are selected to form the keyword. A query expression in which the 10 selected important words are coupled by OR is formed and provided to the search executing unit 42. On the basis of the query expression derived from the keyword forming unit 40, the search executing unit 42 performs a search collation with the index 52 in the search database 22, extracts an index which satisfies a predetermined similarity as a search result, and transmits the search result to the WWW browser 16 side by the WWW server 18, thereby enabling the user to refer to the search result in a form of a document list. Further, the document search unit 30 can also perform a document search using property information of the file designated as a search condition stored in the search designation file storing unit 34. For this purpose, when the document file is designated as a search condition, the search condition designating unit 26 in the WWW browser 16 extracts the property information of the designated document file and transmits the property information to the search machine 20 side together with the head file portion, for example, 1 kB of the head file portion of the document designated as a search condition. In the document search unit 30 in FIG. 3, in addition to the extraction of the text document from the file contents, the extraction of the nouns by the morpheme analysis, and the formation of the keyword by the selection of the important words with respect to the nouns, for example, a date of formation, a writer, a title, and the like are extracted from the property information added to the file contents stored in the search designation file storing unit 34. The property information is included in the keyword by the keyword forming unit 40. The index 52 in the search database 22 is searched by the search executing unit 42.

Figure 4:
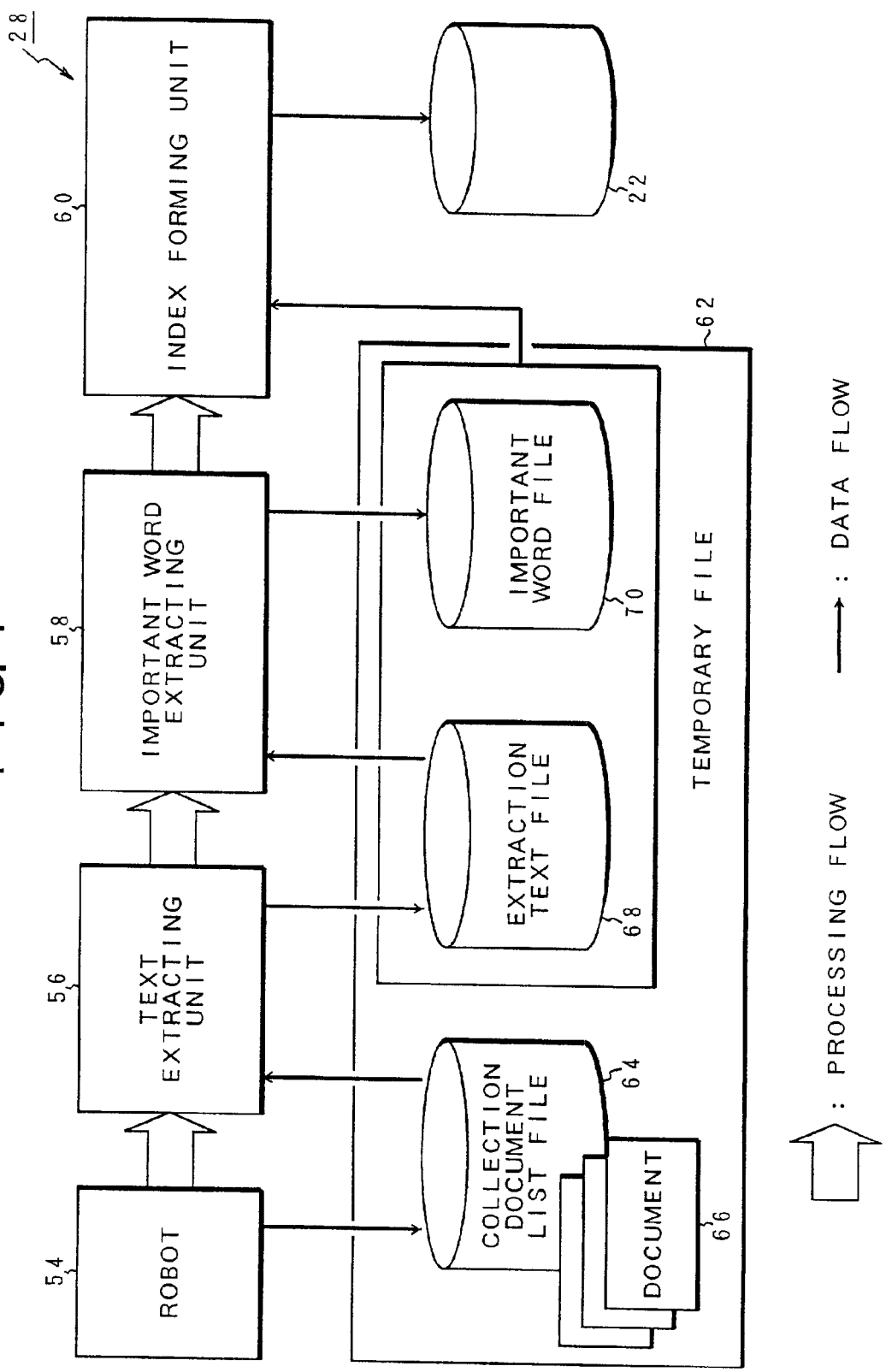
FIG. 4 is an explanatory diagram of a process of a search database forming unit in FIG. 2.

FIG. 4 is an explanatory diagram of the index forming process by the search database forming unit 28 provided in the search machine 20 in FIG. 2. In the search database forming unit 28, a robot 54 collects documents 66 from the external document databases 46 and 50 and stores them into a temporary file 62 and, at the same time, adds a list of the collected documents 66 into a collection document list file 64. The robot 54 subsequently sends a process to a text extracting unit 56. The text extracting unit 56 extracts the collected documents 66 from the collection document list file 64 and stores them into an extraction text file 68. Subsequently, the process is sent to an important word extracting unit 58. The important word extracting unit 58 extracts nouns from the relevant text document in the extraction text file 68 by a morpheme analysis, counts the number of times of appearance with respect to each noun, extracts, for example, upper ten words in which the number of times of appearance is high as important words, and stores them into an important word file 70. Subsequently, the process is sent to an index forming unit 60. The index forming unit 60 extracts a set of, for example, upper ten important words with respect to the relevant document, further forms an index in which the document name and the storing location have been added, and stores it as index information into the search database 22.

FIG. 5 is a flowchart for a browser process for performing the designation of the search condition and the display of the search result by the WWW browser 16 in FIG. 2. When the user opens the search function of the WWW browser 16, a search picture plane is displayed in step S1. When the search picture plane is displayed, a designating operation of the search condition in which the document file has been designated is performed in step S2. Subsequently, in step S3, whether the search has been activated or not is discriminated. When the search activation is determined, whether the search is a file designating search or not is discriminated in step S4. If YES, step S5 follows and the file designated by the user is read out. In step S6, 1 kB of the head in the designated file is transmitted to the server together with the search requesting message. If the search is not the file designating search, a search requesting message corresponding to the other search, for example, a keyword search is transmitted to the server in step S7. When the head portion in the designated file is transmitted to the server in step S6, the apparatus waits for reception of the search result in step S8. When the search result is received from the server in step S8, step S9 follows and the user executes a display operating process of the search result and looks at the search contents. Such processes in steps S1 to S9 are repeated until a search end instruction for closing the search picture plane is issued in step S10.

Figure 6B:
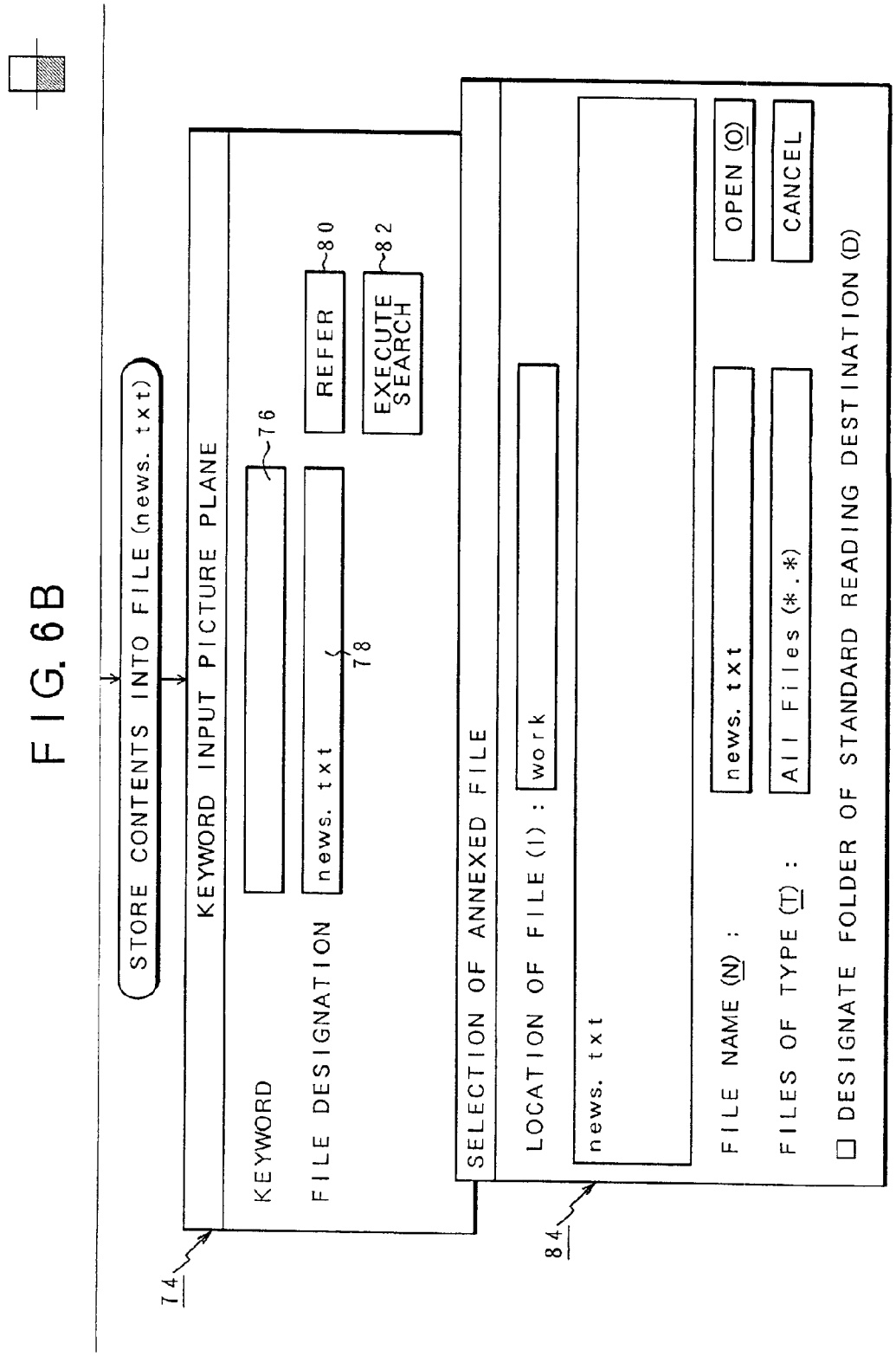

FIGS. 6A and 6B show a specific procedure and a state of the picture plane in the case where the document file is designated as a search condition in the browser process in FIG. 5. First, the user obtains a document file 72 to be designated as a search condition from, for example, the Internet. The user looks at the contents in the document file 72 and stores the contents in the document file 72 into a predesignated file, for example, a file "news.txt" in order to search documents similar to the document file 72. The user subsequently opens a keyword input picture plane 74. A keyword input unit 76, a file designating unit 78, a Refer button 80, and an Execute search button 82 are provided for the keyword input picture plane 74. The user presses the Refer button 80 on the keyword input picture plane 74, thereby displaying a file selection dialog 84. Since the document file 72 which the user wants to designate as a search condition has been stored in the file selection dialog 84, by selecting the file name "news.txt" by clicking a mouse, the selected file name "news.txt" is set into the file designating unit 78 on the keyword input picture plane 74. After completion of the file designation by the file designating unit 78 as mentioned above, by pressing the Execute search button 82, 1 kB of the head portion of the document contents in the document file "news.txt" designated as a search condition is transmitted to the server together with the search request.

Figure 7:
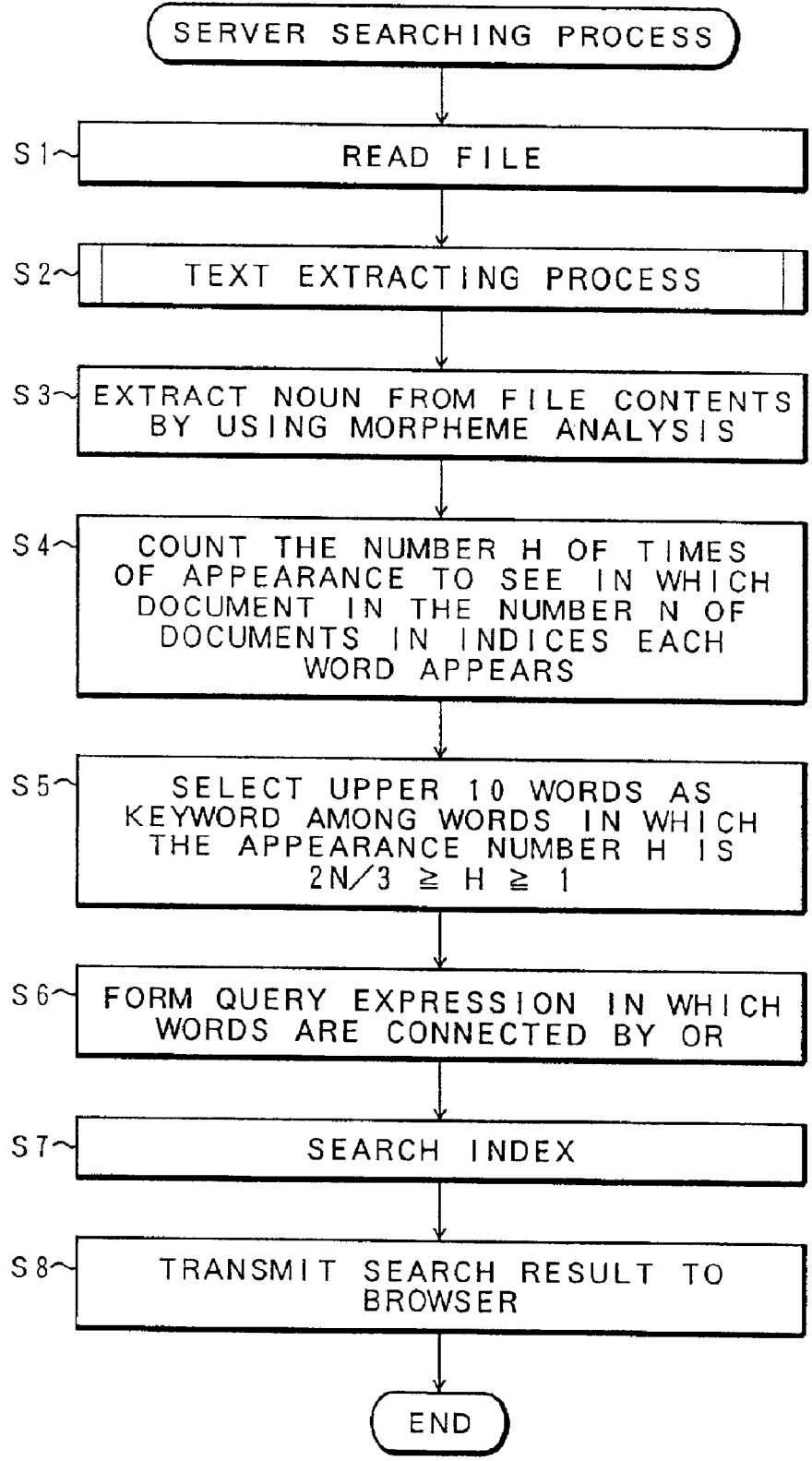
FIG. 7 is a flowchart for a server searching process of the invention.

FIG. 7 is a flowchart for the server searching process which is realized by the document search unit 30 in FIG. 3.

In the server searching process, the document file designated as a search condition is read in step S1. A process for extracting the text document from the document file is performed in step S2. Subsequently, nouns are extracted from the contents of the extracted text document by using the morpheme analysis in step S3. A process for counting the number (H) of times of appearance showing in which documents in the number (N) of documents in the index 52 provided for the search database 22 each word extracted as a noun appears is performed in step S4. If the number (H) of times of appearance in the index of each word can be counted, in step S5, the words in a range in which the number (H) of times of appearance is equal to or smaller than (2N/3) and is equal to or larger than 1 ($1 \geq H \geq 2N/3$) are first selected and upper ten words in which the number (H) of times of appearance is large among the selected words are selected as important words which are used as a keyword. Subsequently, a query expression in which the 10 words selected as important words are coupled by OR is formed in step S6. In step S7, the index in the search database by the query expression formed as a search keyword is searched and the contents of the index having a predetermined similarity for the formed keyword are collected as search documents into a list table. The search result is transmitted to the browser in step S8.

Figure 8:
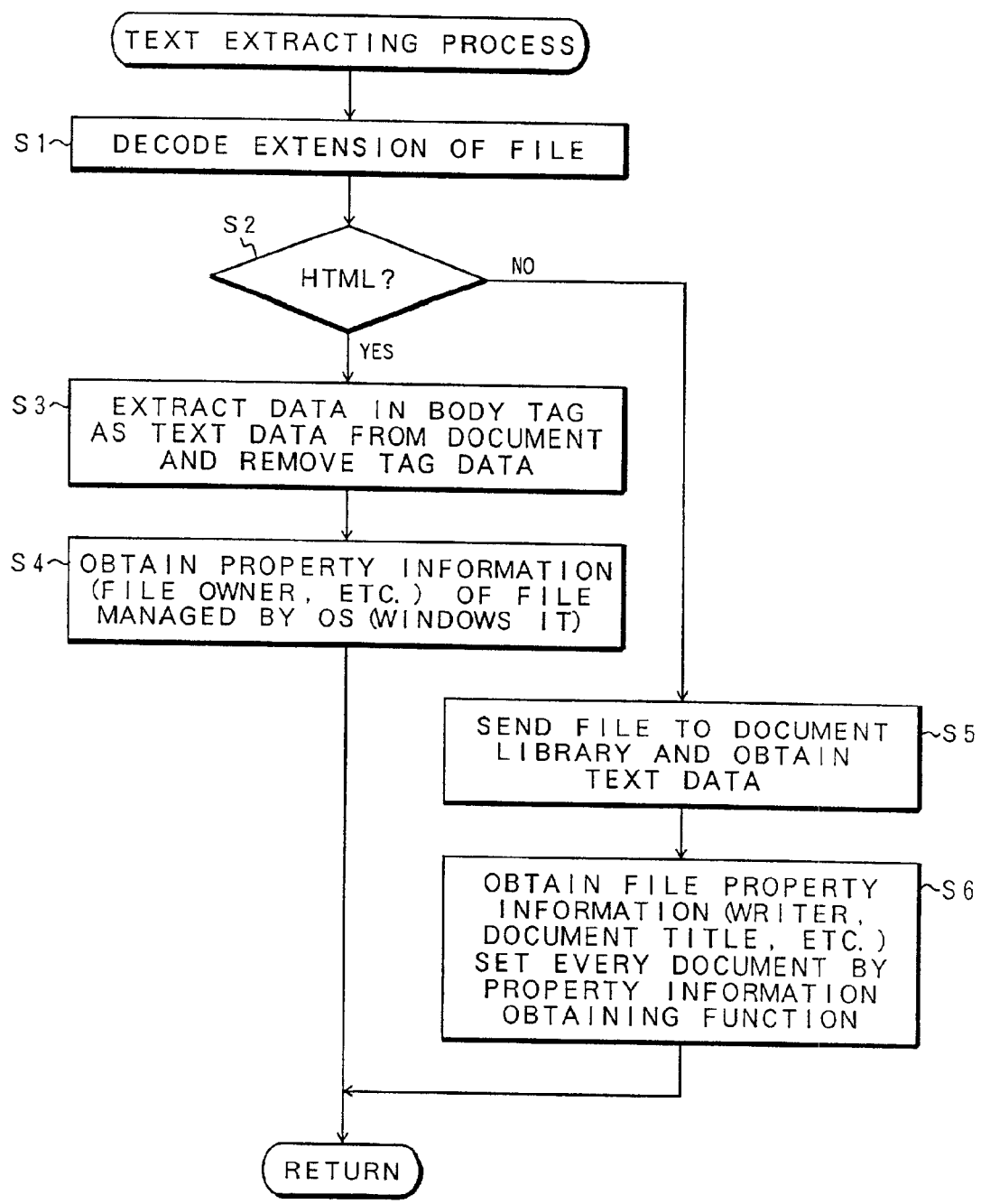
FIG. 8 is a flowchart for a text extracting process in FIG. 7.

FIG. 8 shows the details of the text extracting process in step S2 in FIG. 7. In the text extracting process, an extension of the document file is decoded in step S1. When it is recognized from the file extension that the text is an HTML document in step S2, step S3 follows. Data in a body tag in the HTML document is extracted as a text data main body and tag data is removed. For example, in case of an HTML file as shown in FIG. 9A, data in a body word surrounded by < > is extracted as a text data main body and the tag data is removed, so that an extraction text document as shown in FIG. 9B is obtained. Subsequently, property information of the file managed by the OS is obtained in step S4. The property information includes, for example, a file owner, a document type, and the like.

FIG. 10 shows an example of the property information of the document file obtained from the Internet. In this property information, a document title "With respect to document management system", a date of formation, a date of change, and the like exist. Those property data is obtained to form a keyword. If the document is not the HTML document but, for example, an Excel document or the like in step S2, the file is sent to a document library and text data is obtained in step S5. Subsequently, in step S6, the file property information set every document, for example, the writer, the document title, and the like are obtained by a property information obtaining function.

Figure 11A:

FIGS. 11A and 11B show an Excel file as a file (other than the HTML file) which is designated as a search condition in the invention. With respect to this Excel file, when it is sent to the document library and the text data is obtained, a result obtained by extracting the text document written in the Excel document as shown in an extraction text document in FIG. 12 is obtained. The text documents from the HTML document and Excel document obtained by such a text extracting process and, further, the text documents derived from the property information are collected and nouns are extracted by using the morpheme analysis in step S3 in FIG. 7. In steps S4 and S5, upper ten important words are selected as keywords with reference to the index in the database, a query expression is formed, the index in the database is searched, and a search result can be obtained. When obtaining the property information in steps S4 and S6 in the text extracting process in FIG. 8, whether the property information is used or not can be selected by the designation on the user side in the WWW browser 16. The discrimination about the use of the property information depends on a judgment of the user to decide to which extent the search result is narrowed down.

The invention also provides a computer-readable recording medium in which a document information search program for allowing the search machine 20 in FIG. 3 to execute a processing function of the document search unit 30 has been recorded. An embodiment of the recording medium incorporates a removable portable recording medium such as CD-ROM, floppy disk, or the like, a storing device of a program provider who provides the program by a line, and further, a memory device such as RAM, hard disk, or the like of a processing apparatus in which the program has been installed. The document information search program which is provided by the recording medium and used for realizing the functions of the document search unit 30 in FIG. 3, specifically speaking, the document information search program having processing steps of executing the processes shown in the flowcharts of FIGS. 8 and 9 is installed into the processing apparatus such as a server or the like and executed on a main memory. When a service request is received from the client side, the document information search program of the invention installed to the server side uploads the WWW browser function for designating the search condition by the file designation onto the client 12 side, thereby enabling the user to use the search system.

According to the invention as mentioned above, when the user obtains the document including the interesting contents by the Email, Internet, or the like, in the document search of the contents similar to such a document, by directly designating the document file as a search condition, the documents having similar contents can be simply and rapidly searched. The troublesome inputting operation of the keyword based on the document contents becomes unnecessary. The search of the similar documents by the user can be extremely efficiently realized. In the formation of the keyword necessary for the document search by the file designation, besides the operation for extracting the important words from the document contents, the important words are extracted also from the property information held in the document file and included in the keyword, so that the similar search of the existing documents registered in the database is more properly narrowed down. Precision of the search can be raised.

Although the embodiment has been described with respect to the example of the search system of the server client type, the invention is not limited to it but many other system forms such as a host terminal type can be used. The invention is not limited to the foregoing embodiment but incorporates many proper modifications and variations without losing the objects and advantages of the invention. Further, the invention is not limited by the numerical values shown in the embodiment.

What is claimed is:

1. A document information search apparatus for searching document information on the basis of a search request transmitted through a computer network and responding, wherein:

a search condition designating unit, which designates a file as a search condition and transmits contents of said designated file via the network, is provided for a search requesting source; and a document search unit having a morpheme analyzing unit which extracts nouns by a morpheme analysis of a text document and which forms a keyword from the file contents transmitted from said search condition designating unit and searches similar documents from a database is provided on a search side, wherein said document search unit comprises a search executing unit which searches for similar documents by searching the database by using said keyword and notifies the search requesting source of a search result.

2. An apparatus according to claim 1, wherein said search condition designating unit transmits a head file portion of the designated file contents.

3. An apparatus according to claim 1, wherein said search condition designating unit allows an HTML file and an Excel file to be included in the file which is designated as said search condition.

4. An apparatus according to claim 1, wherein index information describing a list of important words extracted from search target documents is stored for every document in said database, and said document search unit on the search side comprises:

a text extraction processing unit which extracts a text document from the file contents, received in response to the search request;

a keyword forming unit which extracts important words from said nouns and forms a keyword in which said important words are coupled by OR; and a search executing unit which searches for similar documents by searching the database by using said keyword and notifies the search requesting source of a search result.

5. An apparatus according to claim 4, wherein said keyword forming unit counts the number of times of appearance showing in which documents in the index of each of the search documents stored in said document database each of said nouns appears, selects a predetermined number of upper words each having the number of times of appearance in a predetermined range, and forms the keyword.

6. An apparatus according to claim 5, wherein in the case where the number of documents in the index is assumed to be (N), said keyword forming unit selects upper ten words each having the number (H) of times of appearance in a range where $2N/3 \geq H \geq 1$ and forms the keyword.

7. An apparatus according to claim 5, wherein said keyword forming unit allows property information extracted from the file received in response to the search request to be included in said keyword, thereby allowing the similar documents to be searched.

8. An apparatus according to claim 7, wherein said property information includes a writer of the file received in response to the search request and a document title.

9. An apparatus according to claim 1, wherein said search condition designating unit of said search requesting source is provided by a WWW browser of a client, transmits the contents of the file designated by a search request picture plane of said WWW browser to a search machine of a WWW server through the network, and sends said file contents to said document search unit.

10. A document information search apparatus for searching document information on the basis of a search request transmitted through a network and responding, wherein:

a search condition designating unit which designates a file as a search condition and transmits contents of said designated file via the network is provided for a search requesting source; and a document search unit which forms a keyword from the file contents transmitted from said search condition designating unit and searches similar documents from a database is provided on a search side;

wherein index information describing a list of important words extracted from search target documents is stored for every document in said database;

and said document search unit on the search side comprises:

a text extraction processing unit which extracts a text document from the file contents received in response to the search request;

a morpheme analyzing unit which extracts nouns by a morpheme analysis of said text document;

a keyword forming unit which extracts important words from said nouns and forms a keyword in which said important words are coupled by OR; and a search executing unit which searches for similar documents by searching the search database by using said keyword and notifies the search requesting source of a search result; and wherein said keyword forming unit allows property information extracted from the file received in response to the search request to be included in said keyword, thereby allowing the similar documents to be searched.

* * * * *